(12) United States Patent
Lam et al.

(10) Patent No.: US 8,405,371 B2
(45) Date of Patent: Mar. 26, 2013

(54) VOLTAGE REGULATOR WITH RIPPLE COMPENSATION

(75) Inventors: Nelson S. H. Lam, Mississauga (CA); Dino A. Toffolon, Stoney Creek (CA)

(73) Assignee: Synopsys, Inc., Mountain View, CA (US)

( * ) Notice: Subject to any disclaimer, the term of this patent is extended or adjusted under 35 U.S.C. 154(b) by 880 days.

(21) Appl. No.: 12/181,661

(22) Filed: Jul. 29, 2008

(65) Prior Publication Data

US 2010/0026251 A1 Feb. 4, 2010

(51) Int. Cl.
*G05F 1/00* (2006.01)

(52) U.S. Cl. ........................ 323/273; 323/274

(58) Field of Classification Search ........ 323/271, 323/273, 274, 275, 282
See application file for complete search history.

(56) References Cited

U.S. PATENT DOCUMENTS

| 5,629,608 | A | 5/1997 | Budelman | |
|---|---|---|---|---|
| 5,822,166 | A | 10/1998 | Massie | |
| 5,838,145 | A | 11/1998 | Poon | |
| 6,825,726 | B2 * | 11/2004 | French et al. | 330/297 |
| 7,626,367 | B2 * | 12/2009 | Tsai | 323/273 |
| 8,125,204 | B2 * | 2/2012 | Liu et al. | 323/274 |
| 2002/0015319 | A1 | 2/2002 | Hartular | |
| 2002/0043966 | A1 | 4/2002 | Matsuda | |
| 2005/0218875 | A1 * | 10/2005 | Chen et al. | 323/282 |
| 2006/0113977 | A1 | 6/2006 | Reihl | |

FOREIGN PATENT DOCUMENTS

WO 0293340 A1 5/2002

OTHER PUBLICATIONS

Poon, Fanki N.K. et al.,"Very Fast Transient Voltage Regulators Based on Load Correction", 1999 IEEE, pp. 66-71.

\* cited by examiner

*Primary Examiner* — Nguyen Tran
(74) *Attorney, Agent, or Firm* — Park, Vaughan, Fleming & Dowler LLP (57) ABSTRACT

Embodiments of the present invention provide a voltage regulator. The voltage regulator includes a driving mechanism coupled to an output node (VREG), wherein the driving mechanism is configured to provide current to the output node to sustain a predetermined voltage on the output node. In addition, the voltage regulator includes a boost circuit coupled to the output node, wherein the boost circuit is configured to drive an additional current onto the output node to reduce fluctuations in the output node voltage when a load coupled to the output node requires a transient switching current that is faster than the loop response time of the driving mechanism. Furthermore, the boost circuit is biased using a self-tracking mechanism to provide accurate duration and level of the current to the output node in a transient switching event.

25 Claims, 8 Drawing Sheets

VOLTAGE REGULATOR WITH RIPPLE COMPENSATION

BACKGROUND

1. Field of the Invention

Embodiments of the present invention generally relate to the design of voltage regulators. More specifically, embodiments of the present invention provide a low-voltage regulator with ripple compensation.

2. Related Art

Modern high-speed circuits are increasingly requiring voltage regulators that can generate a stable output voltage using low supply voltages. For example, universal serial bus (USB) circuits, peripheral component interface express (PCIe) circuits, and other such high-speed circuits can require output voltages of 1.2 V to be generated from supply voltages of 1.8 V or lower. Unfortunately, as the output voltages required for these circuits are remaining approximately constant, the supply voltages available to the voltage regulators are being scaled downward much more aggressively. Because the difference between the output voltages required to be output by the regulator and the supply voltages that are provided to voltage regulator is decreasing, circuit designers have struggled to design voltage regulators that are simple and reliable and do not require excessive area or power. This issue is generally referred to as a headroom problem.

Figure 1A:
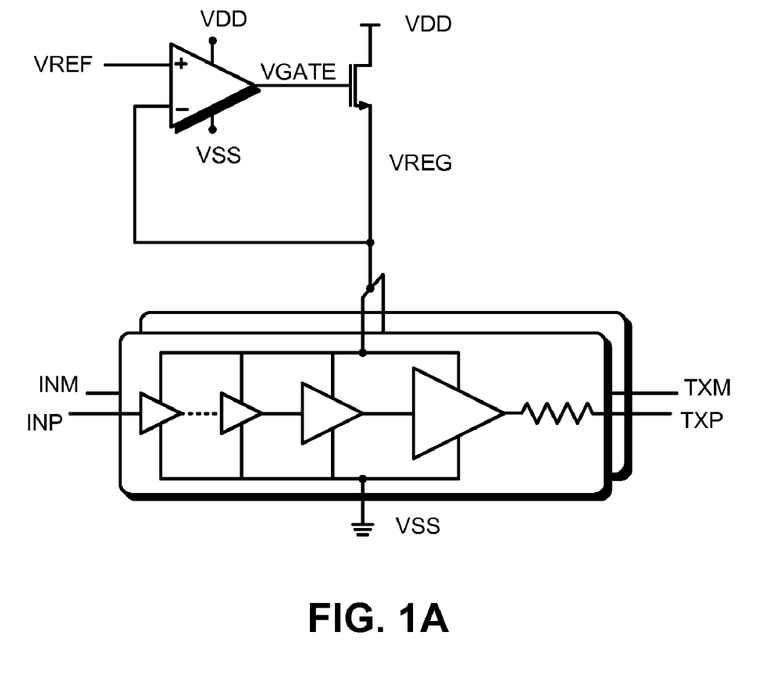
FIG. 1A presents a circuit diagram of an NMOS voltage regulator.

One proposed voltage regulator uses an NMOS transistor as part of a voltage-regulation element. For example, FIG. 1A presents a circuit diagram illustrating such an NMOS voltage regulator. Note that NMOS voltage regulators provide low output impedance at high frequency and require less area than other voltage regulator designs. However, NMOS voltage regulators require a high supply voltage on node VDD to ensure that the voltage regulator is able to maintain the NMOS transistor in the "on" state. Specifically, the node VGATE needs to be at least a threshold voltage above the node VREG to maintain the NMOS transistor in the "on" state (where the threshold voltage is approximately 1 V due to the body effect). Consequently, as supply voltages shrink, NMOS voltage regulators may no longer be able to properly regulate the output voltage on the output node VREG.

Figure 1B:
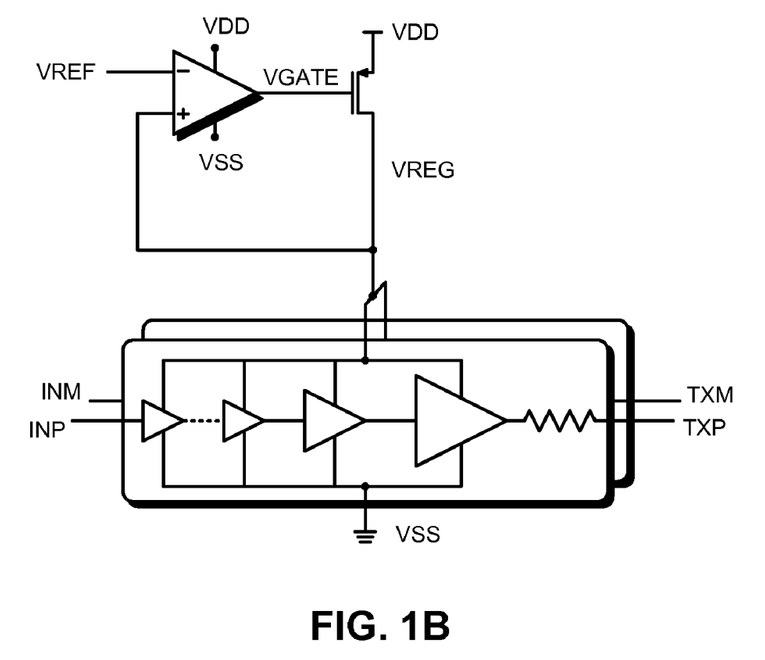
FIG. 1B presents a circuit diagram of a PMOS voltage regulator.

Another proposed voltage regulator uses a PMOS transistor as part of a voltage-regulation element. For example, FIG. 1B presents a circuit diagram illustrating such a PMOS voltage regulator. PMOS voltage regulators do not require as high a supply voltage on node VDD as the NMOS voltage regulator. This is because the node VGATE in a PMOS voltage regulator only needs to be at least a threshold voltage below the node VDD to maintain the PMOS transistor in the "on" state. However, PMOS voltage regulators have a high output impedance beyond the operational amplifier's bandwidth, which can cause a "ripple" in the output voltage on the output node VREG when the voltage regulator is used in high-speed transient switching circuits.

Figure 1C:
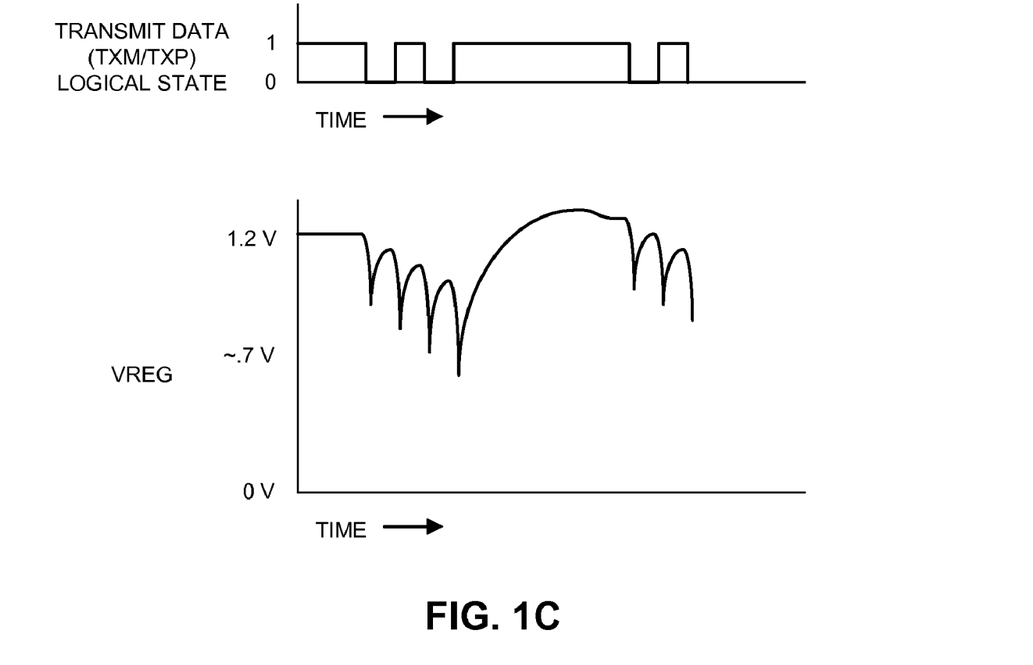
FIG. 1C presents a graph illustrating ripple in the output voltage of a PMOS voltage regulator during a series of high-speed logical transitions in an integrated circuit that uses the VREG node as a power supply.
Figure 1D:
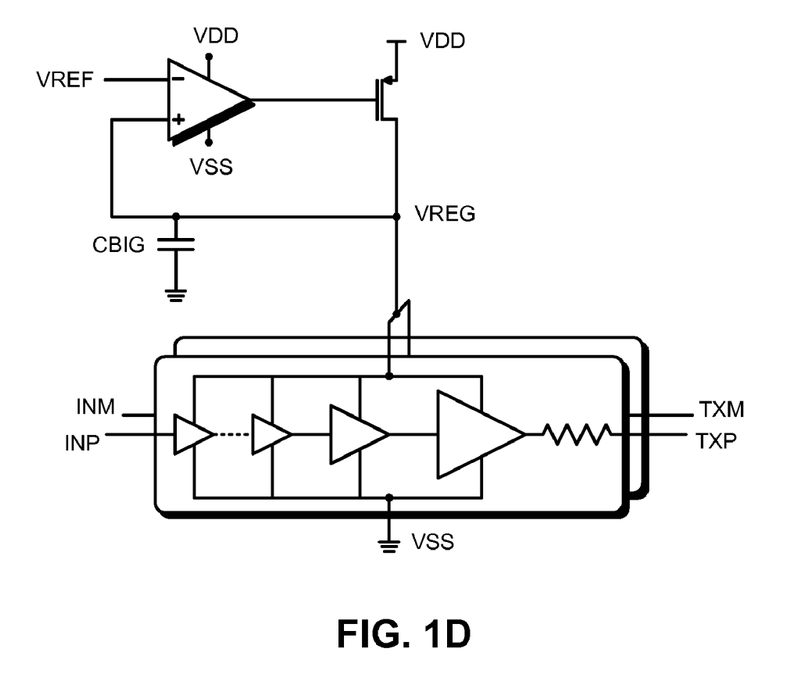
FIG. 1D presents a circuit diagram of a PMOS voltage regulator that includes a capacitor on the output node.

For example, FIG. 1C presents a graph illustrating ripple in the output voltage on the output node VREG of a PMOS voltage regulator during a series of high-speed logical transitions in an integrated circuit that uses the VREG node as a power supply. To reduce such ripples in the output voltage, PMOS voltage regulators typically include a capacitor coupled to the output node VREG. FIG. 1D presents a circuit diagram of a PMOS voltage regulator that includes such a capacitor (CBIG) on the output node VREG. Unfortunately, adding capacitance to the output node has drawbacks, such as requiring additional area and creating stability problems.

SUMMARY

Embodiments of the present invention provide a voltage regulator. The voltage regulator includes a driving mechanism 300 (see FIG. 3) coupled to an output node (VREG), wherein driving mechanism 300 is configured to provide current to the output node to sustain a predetermined voltage on the output node. In addition, the voltage regulator includes boost circuit 308 coupled to the output node, wherein boost circuit 308 is configured to drive an additional current onto the output node to reduce fluctuations in the output node voltage when a load coupled to the output node requires a transient switching current on the output node. Note that low-power high-speed output drivers often require a large transient switching current that is faster than the loop response time of driving mechanism 300 (i.e., the time for driving mechanism to respond to feedback from the output node).

Figure 3:
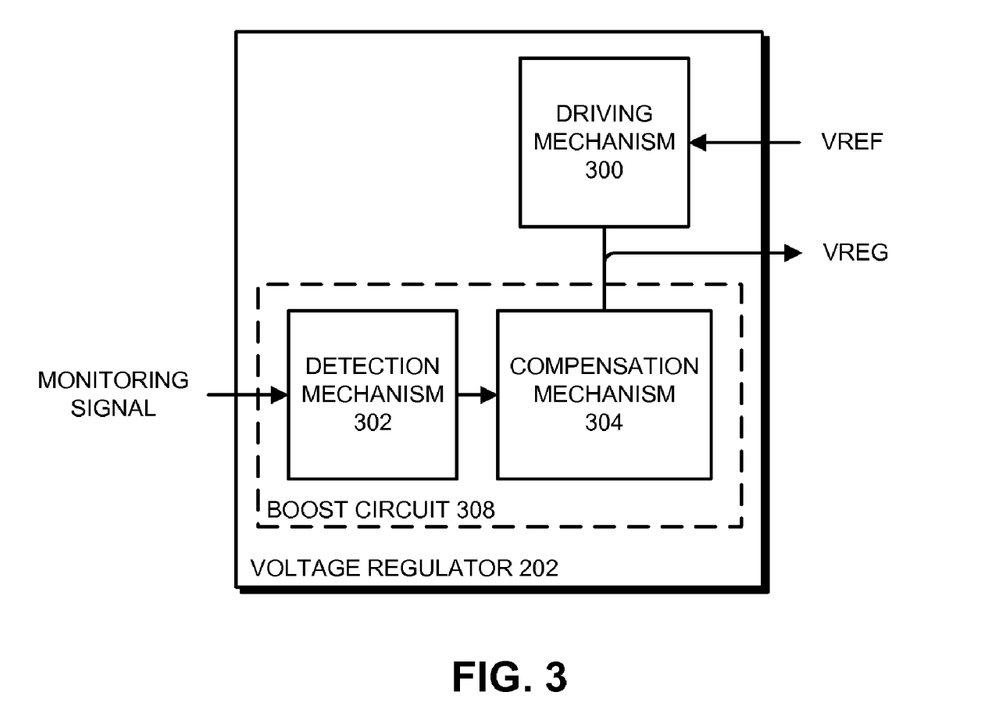
FIG. 3 presents a block diagram of a voltage regulator in accordance with some embodiments of the present invention.

In some embodiments, boost circuit 308 includes compensation mechanism 304 coupled to the output node and detection mechanism 302 coupled to compensation mechanism 304. In these embodiments, detection mechanism 302 monitors the load on the output node to determine when the load on the output node will require a transient switching current that is faster than the loop response time of driving mechanism 300. Upon determining that the load on the output node will require a transient switching current, detection mechanism 302 signals compensation mechanism 304 to drive the additional current onto the output node.

In some embodiments, the compensation mechanism 304 includes a current source and a switch that is coupled between the current source and the output node. In these embodiments, a control for the switch is coupled to detection mechanism 302. The switch is configured to remain open until detection mechanism 302 activates the control and closes the switch. When signaling compensation mechanism 304, detection mechanism 302 is configured to activate the control and close the switch, thereby allowing a current to be driven from the current source to the output node.

In some embodiments, the switch includes a first MOS transistor and the current source includes a second MOS transistor. In these embodiments, detection mechanism 302 is configured to hold the first MOS transistor in a cut-off operating region when the switch is open, and in a linear operating region when the switch is closed. In addition, these embodiments include a biasing circuit that is coupled to a gate of the second MOS transistor that biases the second MOS transistor so that the second MOS transistor provides current to the output node when the first MOS transistor is in the linear operating region.

In some embodiments, a circuit is coupled to the output node of the voltage regulator. The circuit is configured to use the output node as a power supply at the predetermined voltage.

In some embodiments, the voltage regulator includes one or more monitoring signals. Each monitoring signal is coupled between detection mechanism 302 and one or more separate internal nodes, clock signals, synchronization signals, or other locations in the circuit. In these embodiments, detection mechanism 302 is configured to use the monitoring signals to determine when the load on the output node will require a transient switching current that is faster than the loop response time of driving mechanism 300.

In some embodiments, the circuit coupled to the output node includes an output driver for one or more: (1) high-definition media interface (HDMI); (2) 10-gigabit Ethernet (XAUI) protocol; (3) serial advanced technology attachment (SATA) protocol; (4) peripheral component interface express (PCIe); or (5) universal serial bus (USB) circuits.

In some embodiments, driving mechanism 300 comprises an operational amplifier (op-amp) coupled to a PMOS transistor. In these embodiments, a first input of the op-amp is coupled to a reference voltage input and a second input of the op-amp is coupled to the output node, and an output of the op-amp is coupled to a gate of the PMOS transistor, while a source of the PMOS transistor is coupled to a VDD signal and a drain of the PMOS transistor is coupled to the output node. Based on a difference between a voltage on the reference voltage input and the voltage on the output node, the op-amp is configured to set a gate voltage of the PMOS transistor to provide a current to the output node to sustain the predetermined voltage on the output node.

In some embodiments, the boost circuit is configured so that the duration of a current that is driven to the output node is proportional to the duration of transient switching events that occur in an output driver in the circuit.

In some embodiments, the boost circuit is configured so that the amplitude of the current that is driven to the output node is proportional to the VREG node voltage and scales over process corners.

Embodiments of the present invention provide a circuit for regulating voltage. The circuit starts by providing current from driving mechanism 300 to an output node (VREG) to sustain a predetermined voltage on the output node. The circuit then drives an additional current from boost circuit 308 to the output node to reduce fluctuations in a voltage of the output node when a load on the output node requires a transient switching current that is faster than the loop response time of driving mechanism 300.

Embodiments of the present invention provide an electronic device. The electronic device includes at least one circuit coupled to an output node, wherein the output node is configured to provide power supply for the circuit at a predetermined voltage. The electronic device also includes a driving mechanism coupled to the output node, wherein driving mechanism 300 is configured to provide current to the output node to sustain the predetermined voltage on the output node. In addition, the electronic device includes boost circuit 308 coupled to the output node, wherein boost circuit 308 is configured to drive an additional current onto the output node to reduce fluctuations of the voltage of the output node when a load requires a transient switching current on the output node that is faster than the loop response time of driving mechanism 300.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Electronic Device

Figure 2:
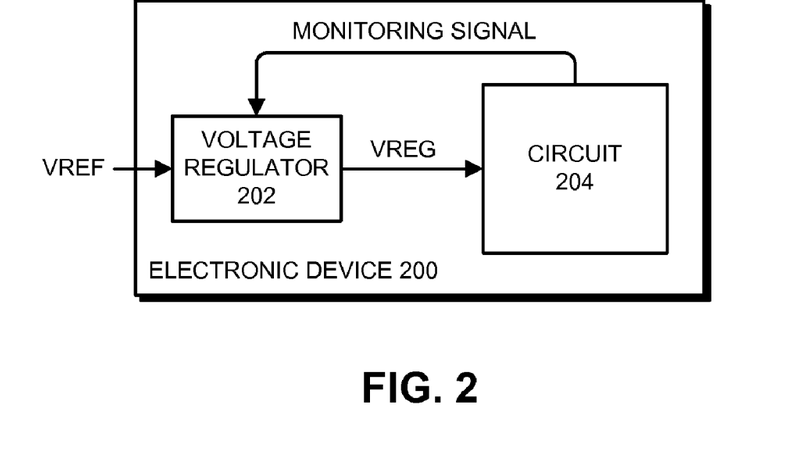
FIG. 2 presents an electronic device in accordance with embodiments of the present invention.

FIG. 2 presents an electronic device 200 in accordance with embodiments of the present invention. Generally, electronic device 200 can be any device that includes electrical circuits. For example, electronic device 200 can include, but is not limited to, a computer, a cellular phone, a controller, a hybrid device (i.e., a "smart phone"), a personal digital assistant (PDA), a network device, a toy, an electric toothbrush, a security system, an electronic gaming system, a thermostat, a measuring device, or an appliance.

Electronic device 200 includes voltage regulator 202 and circuit 204. Voltage regulator 202 supplies an electrical signal to circuit 204 at a predetermined voltage level. Voltage regulator 202 takes a reference voltage signal on the VREF node as an input and outputs a voltage at the predetermined level on the VREG node (interchangeably called the output node). For example, voltage regulator 202 can output 1.2 V on the VREG node. In embodiments of the present invention, voltage regulator 202 includes circuitry to reduce ripple in the output voltage (i.e., fluctuations in the level of the output voltage). The circuitry is described in more detail below.

Circuit 204 can include circuits and/or discrete components that use a voltage-regulated input signal. For example, circuit 204 can include, but is not limited to, integrated circuit chips such as processors, application-specific integrated circuits (ASICs), and other circuits. In some embodiments of the present invention, circuit 204 is a low-voltage output driver for high-speed communication circuits for protocols such as high-definition media interface (HDMI), 10-gigabit Ethernet (XAUI), serial advanced technology attachment (SATA), peripheral component interface express (PCIe), universal serial bus (USB), or other protocols. In some embodiments of the present invention, circuit 204 is an integrated circuit that uses the signal from voltage regulator 202 as a power supply at the predetermined voltage.

In some embodiments of the present invention, voltage regulator 202 is fabricated on an integrated circuit chip using techniques that are known in the art. In some embodiments, voltage regulator 202 includes one or more discrete circuit elements.

Although FIG. 2 presents an embodiment of the present invention where voltage regulator 202 is separate from circuit 204, in alternative embodiments, one or more separate voltage regulators 202 are included in circuit 204. Moreover, circuit 204 and voltage regulator 202, can be incorporated into a single integrated chip (e.g., on a microprocessor, an ASIC, or on a "system-on-a-chip").

Voltage Regulator

FIG. 3 presents a block diagram of a voltage regulator 202 in accordance with some embodiments of the present invention. As is illustrated in FIG. 3, voltage regulator 202 includes driving mechanism 300 and boost circuit 308, wherein boost circuit 308 includes detection mechanism 302 and compensation mechanism 304.

In embodiments of the present invention, driving mechanism 300 sustains a predetermined voltage on the voltage regulator's output node VREG. For example, driving mechanism 300 can sustain 1.2 V, 1.0 V, or another voltage on the VREG node. In these embodiments, driving mechanism 300 provides current to the VREG node (i.e., to circuit elements that are drawing current from VREG) to ensure that the predetermined voltage level is sustained on the VREG node.

In some embodiments of the present invention, driving mechanism 300 takes the VREF node as an input. Based on a difference between a voltage on the VREG node and the VREF node, driving mechanism 300 can output more current to maintain a voltage level on the VREG node. In these embodiments, the voltage on the VREF node can be 1.0 V, 1.2 V, or another voltage.

In some embodiments of the present invention, compensation mechanism 304 drives additional current onto the VREG node in order to prevent the voltage on the VREG node from falling below the predetermined voltage. More specifically, as described above, the VREG node can serve as a power supply node for circuit 204. During periods of loading, such as when a signal logically transitions in circuit 204, circuit 204 may require more transient switching current from the VREG node than can be immediately sourced by driving mechanism 300. Consequently, without assistance, the VREG node may fall below the predetermined voltage due to slow loop response time of the driving mechanism 300. In order to reduce such a drop in the voltage on the VREG node (and thereby reduce the ripple in the output of voltage regulator 202), compensation mechanism 304 provides an additional "boost" current into the VREG node to supply the demand.

In some embodiments of the present invention, detection mechanism 302 monitors circuit 204 to determine when a fluctuation in the voltage of the VREG node is about to occur. Upon detecting an upcoming fluctuation in the voltage of the VREG node, detection mechanism 302 signals compensation mechanism 304 to drive more current onto the VREG node.

In some embodiments of the present invention, detection mechanism 302 takes a monitoring signal as an input and outputs an adjustment signal to compensation mechanism 304. In these embodiments, the monitoring signal can be coupled to a node within circuit 204. For example, the node can be an intermediate node within a high-drive-strength output driver in circuit 204 that can provide an indication of when the remaining devices in the output driver are about to transition (and present a large transient load on the VREG node). When a voltage change occurs on the node, detection mechanism 302 can signal compensation mechanism 304 to drive additional current onto the VREG node to help sustain the predetermined voltage on the VREG node. Alternatively, monitoring signal can be coupled to a clock, a synchronization signal, or another signal that can be used to determine when a load is going to occur on the VREG node.

In some embodiments of the present invention, the monitoring signal includes two or more signal lines that are coupled to separate internal nodes in circuit 204. In these embodiments, detection mechanism 302 monitors the logical states, voltages, current, relative voltages/currents, or other indicators of the status of two or more internal nodes in circuit 204 and can signal compensation mechanism 304 to drive additional current onto the VREG node based on the status of the internal nodes.

Boost Circuit

Figure 4:
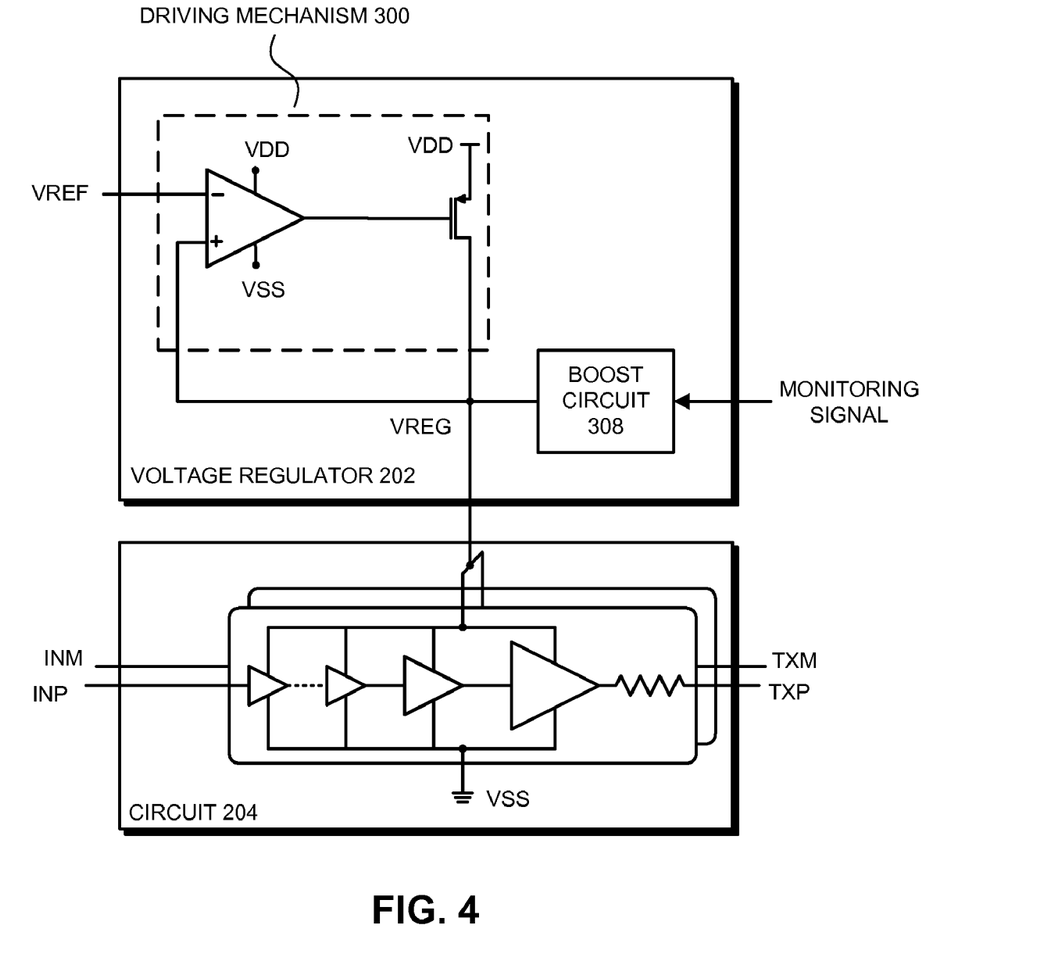
FIG. 4 presents a circuit diagram illustrating a voltage regulator in accordance with embodiments of the present invention.

FIG. 4 presents a circuit diagram illustrating a voltage regulator 202 in accordance with embodiments of the present invention. As can be seen in FIG. 4, voltage regulator 202 is a PMOS voltage regulator (i.e., driving mechanism 300 includes a PMOS transistor that is used to maintain the voltage on the VREG node).

Recall that PMOS voltage regulators have high output impedance at high frequencies, which can lead to "ripple" in the output voltage (see FIGS. 1B and 1C). Consequently, existing PMOS voltage regulators require a large capacitance to stabilize the VREG node, which introduces other problems (see FIG. 1D). In contrast, in embodiments of the present invention, boost circuit 308 provides additional transient current to the VREG node to prevent the VREG node from falling below the predetermined voltage due to a large transient switching current (e.g., from circuit 204). Hence, in comparison with existing PMOS voltage regulators, any additional capacitor on the VREG node can be significantly reduced in size. For example, in some embodiments of the present invention, the additional capacitance can be 10 or more times smaller than the capacitances used in existing PMOS voltage regulators. Thus, voltage regulator 202 consumes less area and power and is more stable. (Note that the PMOS voltage regulator 202 in embodiments of the present invention is capable of generating a stable supply voltage for a voltage-mode transmitter when the voltage on the VDD node is 1.8V and below. Without a stable supply voltage, an alternate transmitter implementation is a current-mode/high-power transmitter that consumes four times the current of a voltage-mode transmitter)

The monitoring signal shown in FIG. 4 can include one or more separate signals that are used by boost circuit 308 to determine when an additional current should be driven onto the VREG node. For example, as described above, boost circuit 308 can monitor logical state transitions, voltages, or currents on internal nodes in circuit 204. Alternatively, boost circuit 308 can monitor the VREG node itself or another signal (e.g., a clock or a synchronization signal within circuit 204).

Figure 5:
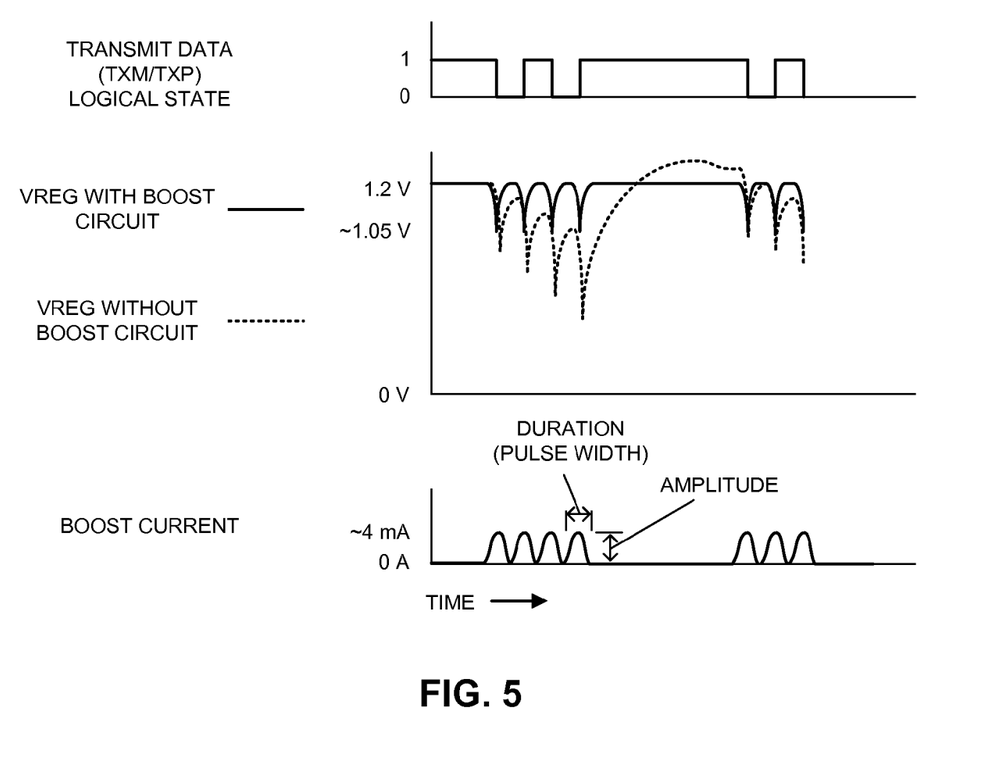
FIG. 5 presents a graph illustrating a reduced ripple in the output voltage of a voltage regulator during a series of high-speed logical transitions in an integrated circuit that uses the VREG node as a power supply.

FIG. 5 presents a graph illustrating the reduced ripple in the output voltage of voltage regulator 202 given a series of high-speed logical transitions in an integrated circuit 204 that uses the VREG node as a power supply. As shown in FIG. 5, boost circuit 308 provides a temporary current to the VREG node with each transition in the output of circuit 204 (i.e., transitions in the TXM and TXP signals). This current enables voltage regulator 202 to provide sufficient current to the large drivers of the TXM and TXP signals during these transitions, avoiding ripple in the voltage on the VREG node. Note that the duration (i.e., pulse width) and the amplitude of the temporary currents are "self-tracking." For example, the amplitude can be controlled by a biasing circuit such as self-tracking mechanism 704 (see FIG. 7), while the duration is controlled by detection mechanism 302.

Note that we define the "loop response time" of driving mechanism 300 as the time between an increase on the load on the VREG node and when driving mechanism 300 provides sufficient current to the VREG node to keep the voltage on the VREG node dropping below the predetermined voltage value.

Also shown in FIG. 5 (using a dashed line) is the VREG voltage without boost circuit 308 for comparison. Without the boost circuit 308, driving mechanism 300 is unable to track instantaneous voltage drop because the loop response time of driving mechanism 300 is too slow. The slow loop response time of driving mechanism 300 (without the boost circuit 308) therefore results in larger ripple in the voltage on the VREG node and higher data-dependent jitter on the circuits connected to the VREG node.

Figure 6:
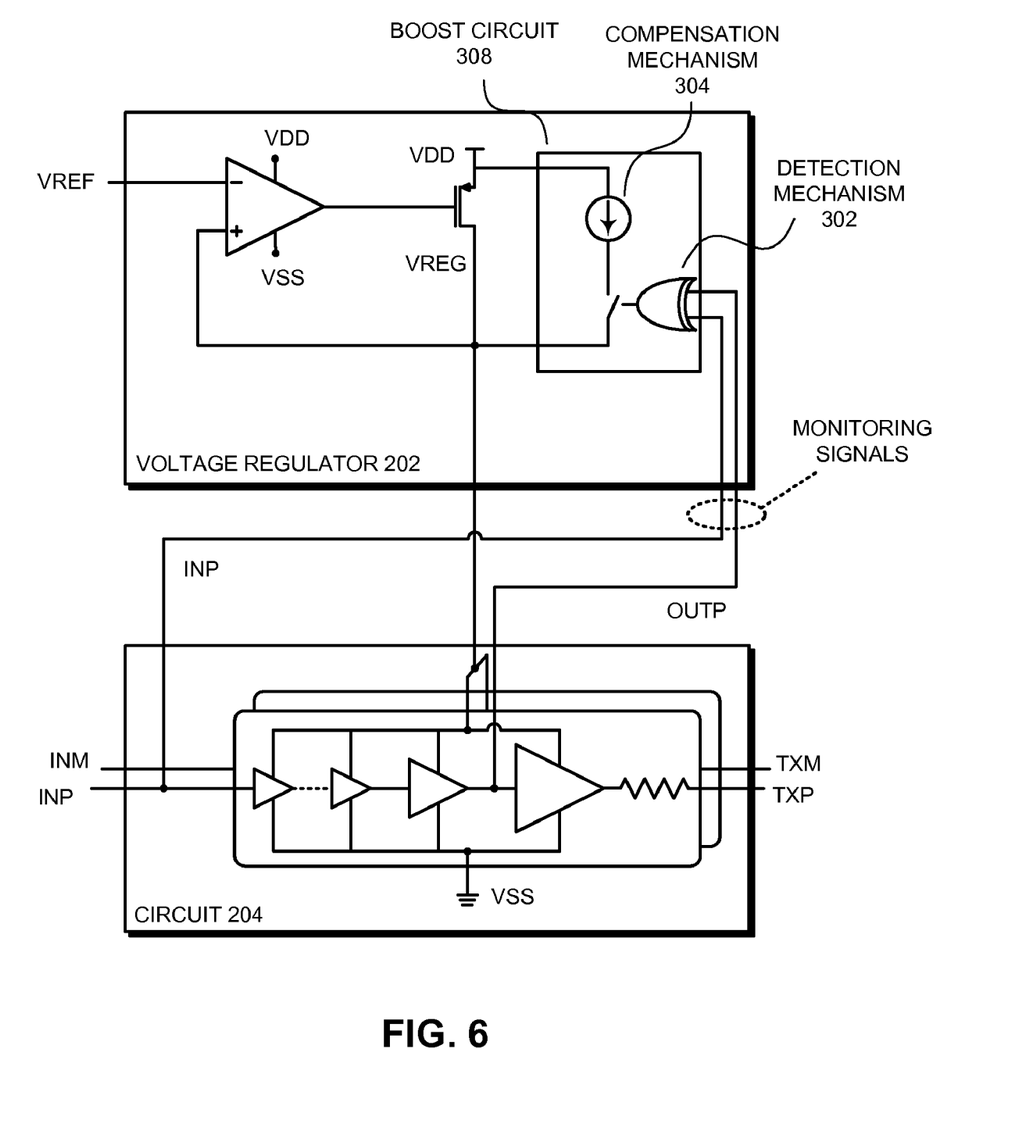
FIG. 6 presents an expanded circuit diagram of the boost circuit in accordance with some embodiments of the present invention.

FIG. 6 presents an expanded circuit diagram of boost circuit 308 in accordance with some embodiments of the present invention. In these embodiments, compensation mechanism 304 is a current source, while detection mechanism 302 is a logical gate. The INP and OUTP signals can trigger an additional current from boost circuit 308 to the VREG node to reduce the ripple in the output of voltage regulator 202.

More specifically, assume that the INP and OUTP signals initially start in the logical "0" state and that there are an even number of inversions between the nodes to which the INP and OUTP signals are coupled. When a "0"-"1" transition occurs on INP, the output of the XOR gate transitions to a logical "1," closing the switch and providing a path to the VREG node from the current source. A number of inverter delays later, the OUTP node transitions from "0"-"1," opening the switch and ending the additional current. A similar sequence takes place as INP and OUTP transition back to "0" from "1" (i.e., both rising and falling transitions in TXM/TXP cause a current to be driven onto the VREG node). Note that the duration that a current is driven onto the VREG node is proportional to the duration of a transient switching event that occurs in the output driver. More specifically, the duration that the boost current is driven onto the VREG node is proportional to the delay through the output driver circuit 204. This self-tracking mechanism provides accurate duration that a current is driven onto the VREG node.

Figure 7:
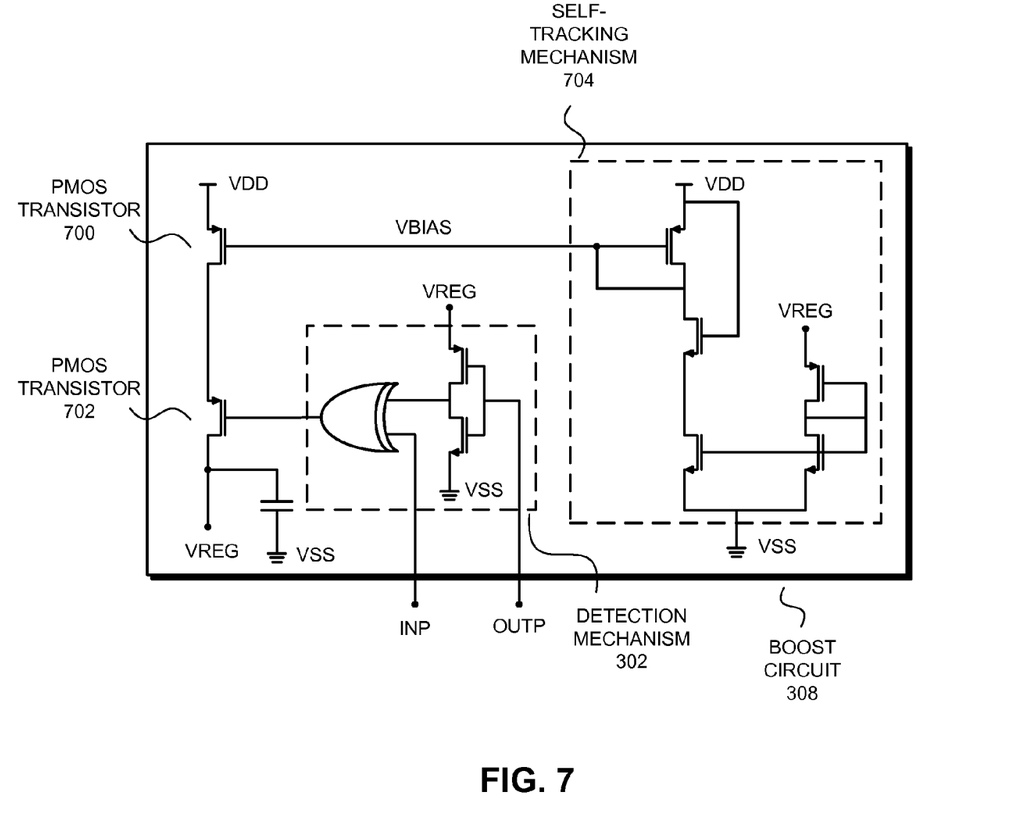
FIG. 7 presents a circuit diagram illustrating a transistor-level view of the boost circuit in accordance with some embodiments of the present invention.

FIG. 7 presents a circuit diagram illustrating a transistor-level view of boost circuit 308 in accordance with some embodiments of the present invention. More specifically, FIG. 7 shows a detailed view of an exemplary current source coupled to a PMOS switch in boost circuit 308 accordance with embodiments of the present invention. The exemplary current source includes a PMOS transistor 700 coupled to a biasing circuit (which provides the bias voltage VBIAS). The function of such a current source is known in the art and hence is not described in more detail. Note that the voltage on VBIAS node is defined such that the boost current driven onto the VREG node will scale over process corners and VREG node voltage. This "self-tracking" mechanism 704 ensures that the bias current to be driven onto the VREG node is at an accurate level (amplitude). PMOS transistor 702 functions as a switch to couple PMOS transistor 700 to output node VREG when providing a boost current on output node VREG.

As shown in FIG. 7, boost circuit 308 includes an XOR gate coupled to INP and OUTP (similar to the XOR gate shown in FIG. 6). Note that the OUTP is inverted before being input into the XOR gate in FIG. 7. This signal is shown as inverted in this example due to the logical relationship (e.g., an odd number of inversions) between INP and OUTP; however, in alternative embodiments of the present invention, the OUTP signal need not be inverted.

Regulating Voltage

Figure 8:
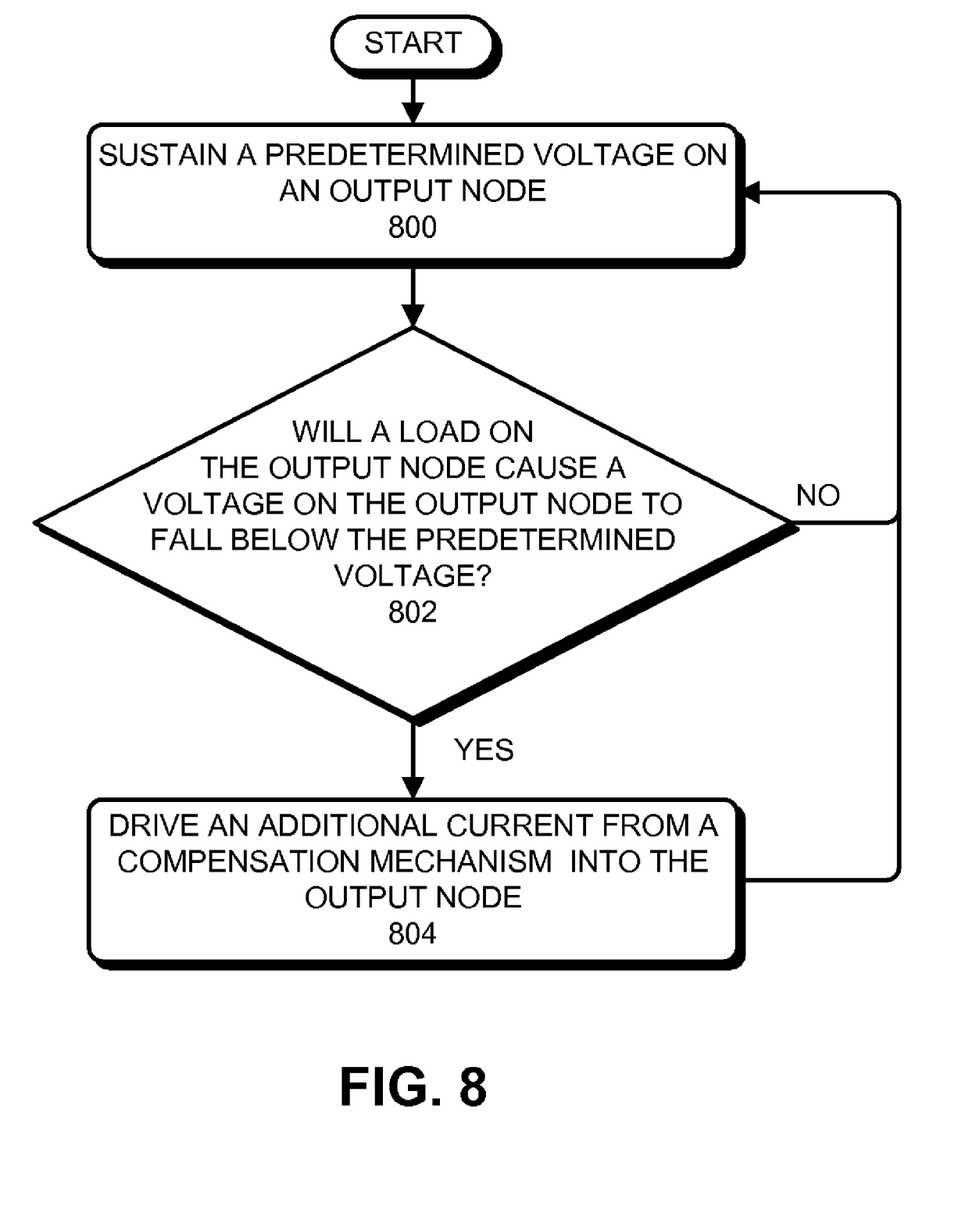
FIG. 8 presents a flowchart illustrating a process for regulating voltage in accordance with embodiments of the present invention.

FIG. 8 presents a flowchart illustrating a process for regulating voltage in accordance with embodiments of the present invention. The process starts with driving mechanism 300 in a voltage regulator 202 sustaining a predetermined voltage on an output node (step 800). More specifically, voltage regulator 202 maintains a predetermined voltage on a VREG output node that is coupled to a power supply for circuit 204. In some embodiments of the present invention, the predetermined voltage can be between 0 and the supply voltage.

While sustaining the predetermined voltage on the VREG node, detection mechanism 302 in voltage regulator 202 monitors one or more values in circuit 204 and/or voltage regulator 202 to determine if a load on the power supply will cause the voltage on the VREG node to fall below the predetermined voltage (step 802). For example, detection mechanism 302 can monitor the logical state, state transitions, or the voltage or current on one or more internal nodes in circuit 204 to determine when a transition of one or more nodes in circuit 204 will cause a transient load and hence a fluctuation in the voltage on the VREG node. Alternatively, detection mechanism 302 can monitor a clock, an enable signal, or another signal that can be used to determine that a fluctuation in the voltage on the VREG node is going to occur. If the voltage on the VREG node will not fall below the predetermined voltage, voltage regulator 202 returns to step 800 to sustain a predetermined voltage on an output node.

If detection mechanism 302 determines that a fluctuation is going to occur on the VREG node, detection mechanism 302 signals compensation mechanism 304 to drive an additional current to the VREG node (step 804). In some embodiments of the present invention, compensation mechanism 304 drives the additional current into the VREG node until detection mechanism 302 signals compensation mechanism 304 to stop driving the current. For example, as illustrated in FIG. 6, detection mechanism 302 can be a logical gate that closes a switch to allow current to be driven from a current source to the VREG node. In alternative embodiments, compensation mechanism 304 can be a self-timing circuit that drives current into the VREG node for a predetermined time after receiving an enable signal from detection mechanism 302. Voltage regulator 202 then returns to step 800 to sustain a predetermined voltage on an output node.

By driving the additional current into the VREG node, embodiments of the present invention reduce the ripple on the output of voltage regulator 202. These embodiments can therefore use PMOS transistors to regulate the voltage on the VREG node without the additional capacitance required in existing systems.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for regulating voltage, comprising:
   a driving mechanism coupled to an output node, wherein the driving mechanism is configured to provide current to the output node to sustain a predetermined voltage on the output node; and
   a boost circuit coupled to the output node, wherein the boost circuit is configured to drive an additional current onto the output node to reduce fluctuations in a voltage of the output node when a load coupled to the output node requires a transient switching current on the output node that must be provided faster than the loop response time of the driving mechanism, wherein the boost circuit is coupled to an internal node within the load to determine when a transient switching current on the internal node will cause the voltage on the output node to fall below the predetermined voltage, and wherein the internal node is different from the output node.

2. The apparatus of claim 1, wherein the boost circuit comprises:
   a compensation mechanism coupled to the output node; and
   a detection mechanism coupled to the compensation mechanism;
   wherein the detection mechanism monitors the load on the output node to determine when the load on the output node will require the transient switching current and signals the compensation mechanism to drive the additional current onto the output node.

3. The apparatus of claim 2, wherein the compensation mechanism comprises:
   a current source; and
   a switch coupled between the current source and the output node;
   wherein the switch is coupled to the detection mechanism and wherein the switch is configured to remain open until the detection mechanism closes the switch; and
   wherein when signaling the compensation mechanism, the detection mechanism is configured to close the switch, causing a current to be driven from the current source to the output node.

4. The apparatus of claim 3, wherein the switch comprises a first MOS transistor and the current source comprises a second MOS transistor;
   wherein the detection mechanism is configured to hold the first MOS transistor in a cut-off operating region when the switch is open, and in a linear operating region when the switch is closed; and
   wherein the second MOS transistor is coupled to a biasing circuit that biases the second MOS transistor so that the second MOS transistor provides current to the output node when the first MOS transistor is in the linear operating region.

5. The apparatus of claim 2, further comprising:
   a circuit coupled to the output node, wherein the circuit is configured to use the output node as a power supply at the predetermined voltage, thereby placing the load on the output node.

6. The apparatus of claim 5, further comprising:
   one or more monitoring signals;
   wherein each monitoring signal is coupled between the detection mechanism and one or more separate internal nodes, clock signals, synchronization signals, or other locations in the circuit; and
   wherein the detection mechanism is configured to use the monitoring signals to determine when the load on the output node will require the transient switching current.

7. The apparatus of claim 5, wherein the circuit coupled to the output node includes one or more:
   high-definition media interface (HDMI);
   10-gigabit Ethernet (XAUI) protocol;
   serial advanced technology attachment (SATA) protocol;
   peripheral component interface express (PCIe); or
   universal serial bus (USB) circuits.

8. The apparatus of claim 5, wherein the boost circuit is configured so that the duration of a current that is driven to the output node is proportional to the duration of transient switching events that occur in an output driver in the circuit.

9. The apparatus of claim 1, wherein the boost circuit is configured so that an amplitude of the current that is driven to the output node is proportional to the VREG node voltage and scales over process corners.

10. A method for regulating voltage, comprising:
    providing current from a driving mechanism to an output node to sustain a predetermined voltage on the output node; and
    driving an additional current from a boost circuit to the output node to reduce fluctuations in a voltage of the output node when a load coupled to the output node requires a transient switching current on the output node that must be provided faster than the loop response time of the driving mechanism, wherein the boost circuit is coupled to an internal node within the load to determine when a transient switching current on the internal node will cause the voltage on the output node to fall below the predetermined voltage, and wherein the internal node is different from the output node.

11. The method of claim 10, wherein driving the additional current from the boost circuit involves:
    using a detection mechanism in the boost circuit to monitor the load on the output node to determine when the load on the output node will require the transient switching current; and
    signaling a compensation mechanism in the boost circuit to drive the additional current onto the output node when the load requires the transient switching current on the output node.

12. The method of claim 11, wherein the compensation mechanism comprises a current source and a switch coupled between the current source and the output node, wherein a control for the switch is coupled to the detection mechanism, wherein the method further comprises:
    holding the switch open until a signal from the detection mechanism activates the control to close the switch; and
    when signaling the compensation mechanism, activating the control using the detection mechanism to close the switch, causing a current to be driven from the current source to the output node.

13. The method of claim 12, wherein the switch comprises a first MOS transistor and the current source comprises a second MOS transistor, wherein a gate connection of the second MOS transistor is coupled to a biasing circuit, and wherein the method further comprises:
    holding the first MOS transistor in a cut-off operating region when the switch is open, and in a linear operating region when the switch is closed; and
    using the biasing circuit to bias the second MOS transistor so that the second MOS transistor provides current to the output node when the first MOS transistor is in the linear operating region.

14. The method of claim 10, wherein a circuit is coupled to the output node, wherein the circuit is configured to use the output node as a power supply at the predetermined voltage and one or more monitoring signals are coupled between the detection mechanism and one or more separate internal nodes, clock signals, synchronization signals, or other locations in the circuit, and wherein the method further comprises:
    using the monitoring signals to determine when the load require the transient switching current on the output node.

15. The method of claim 14, wherein the circuit coupled to the output node includes one or more:
- high-definition media interface (HDMI);
- 10-gigabit Ethernet (XAUI) protocol;
- serial advanced technology attachment (SATA) protocol;
- peripheral component interface express (PCIe); or
- universal serial bus (USB) circuits.

16. The method of claim 14, wherein the duration of the additional current that is driven to the output node is proportional to the duration of transient switching events that occur in an output driver in a circuit that is coupled to the output node.

17. The apparatus of claim 10, wherein an amplitude of the additional current that is driven to the output node is proportional to the VREG node voltage and scales over process corners.

18. An electronic device, comprising:
one or more circuits coupled to an output node, wherein the output node is configured to provide power for the circuit at a predetermined voltage;
a driving mechanism coupled to an output node, wherein the driving mechanism is configured to provide current to the output node to sustain the predetermined voltage on the output node; and
a boost circuit coupled to the output node, wherein the boost circuit is configured to drive an additional current onto the output node to reduce fluctuations in a voltage of the output node when the circuits require a transient switching current on the output node that must be provided faster than the loop response time of the driving mechanism, wherein the boost circuit is coupled to an internal node within the load to determine when a transient switching current on the internal node will cause the voltage on the output node to fall below the predetermined voltage, and wherein the internal node is different from the output node.

19. The electronic device of claim 18, wherein the boost circuit comprises:
a compensation mechanism coupled to the output node; and
a detection mechanism coupled to the compensation mechanism;
wherein the detection mechanism monitors the load on the output node to determine when the load on the output node will require the transient switching current and signals the compensation mechanism to drive the additional current onto the output node.

20. The electronic device of claim 19, wherein the compensation mechanism comprises:
a current source; and
a switch coupled between the current source and the output node;
wherein the switch is coupled to the detection mechanism and wherein the switch is configured to remain open until the detection mechanism closes the switch; and
wherein when signaling the compensation mechanism, the detection mechanism is configured to close the switch, causing a current to be driven from the current source to the output node.

21. The electronic device of claim 20, wherein the switch comprises a first MOS transistor and the current source comprises a second MOS transistor;
wherein the detection mechanism is configured to hold the first MOS transistor in a cut-off operating region when the switch is open, and in a linear operating region when the switch is closed; and
wherein the second MOS transistor is coupled to a biasing circuit that biases the second MOS transistor so that the second MOS transistor provides current to the output node when the first MOS transistor is in the linear operating region.

22. The electronic device of claim 18, further comprising:
one or more monitoring signals;
wherein each monitoring signal is coupled between the detection mechanism and one or more separate internal nodes, clock signals, synchronization signals, or other locations in the circuit; and
wherein the detection mechanism is configured to use the monitoring signals to determine when the load on the output node will require the transient switching current.

23. The electronic device of claim 18, wherein the circuit coupled to the output node includes one or more:
- high-definition media interface (HDMI);
- 10-gigabit Ethernet (XAUI) protocol;
- serial advanced technology attachment (SATA) protocol;
- peripheral component interface express (PCIe); or
- universal serial bus (USB) circuits.

24. The electronic device of claim 18, wherein the boost circuit is configured so that the duration of a current that is driven to the output node is proportional to the duration of transient switching events that occur in an output driver in the circuit.

25. The electronic device of claim 18, wherein the boost circuit is configured so that an amplitude of the current that is driven to the output node is proportional to the VREG node voltage and scales over process corners.

* * * * *